April 11, 1967 G. R. HARTING ETAL 3,313,381
ELECTRO-MAGNETIC BRAKING SYSTEM
Filed July 2, 1964 6 Sheets-Sheet 3

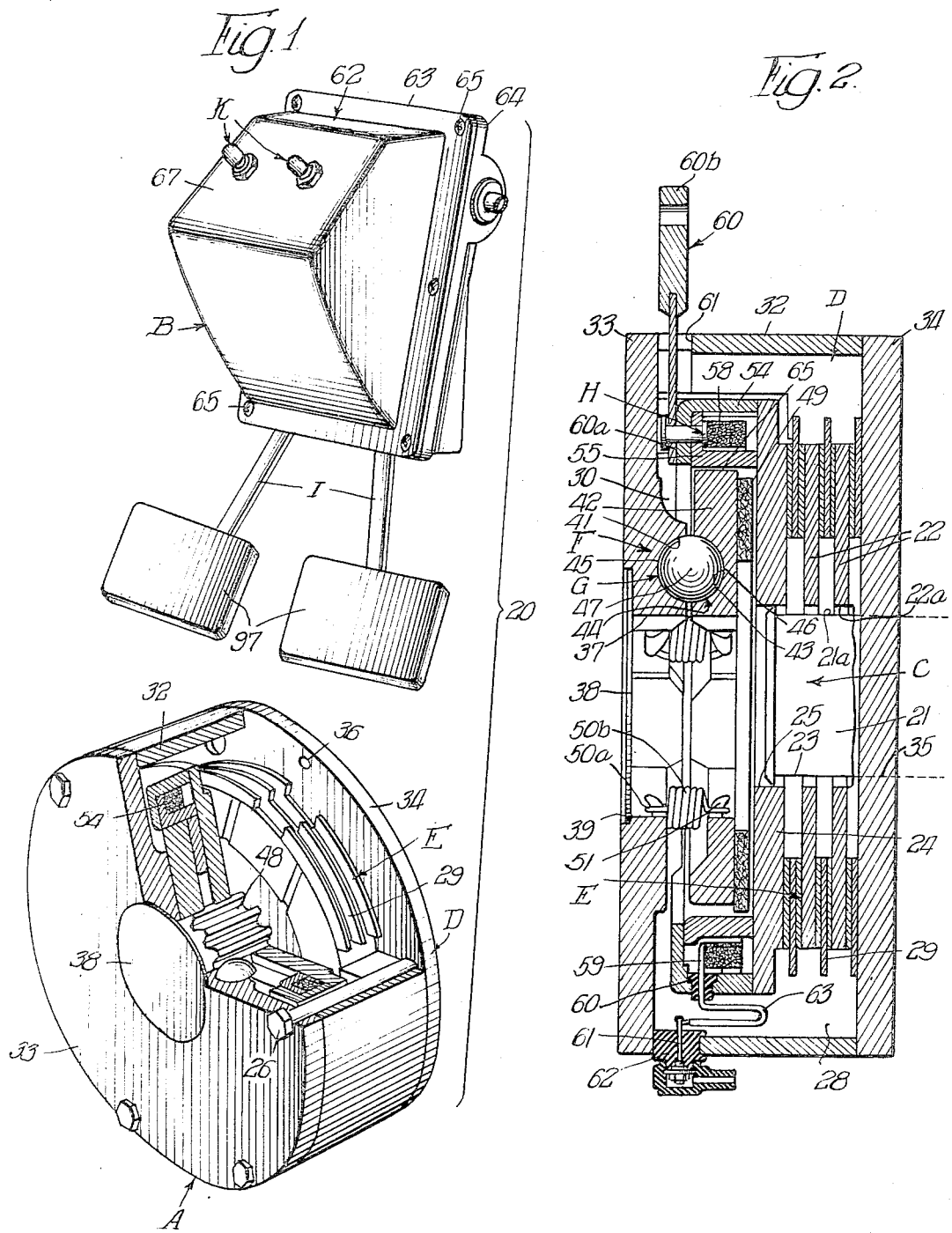

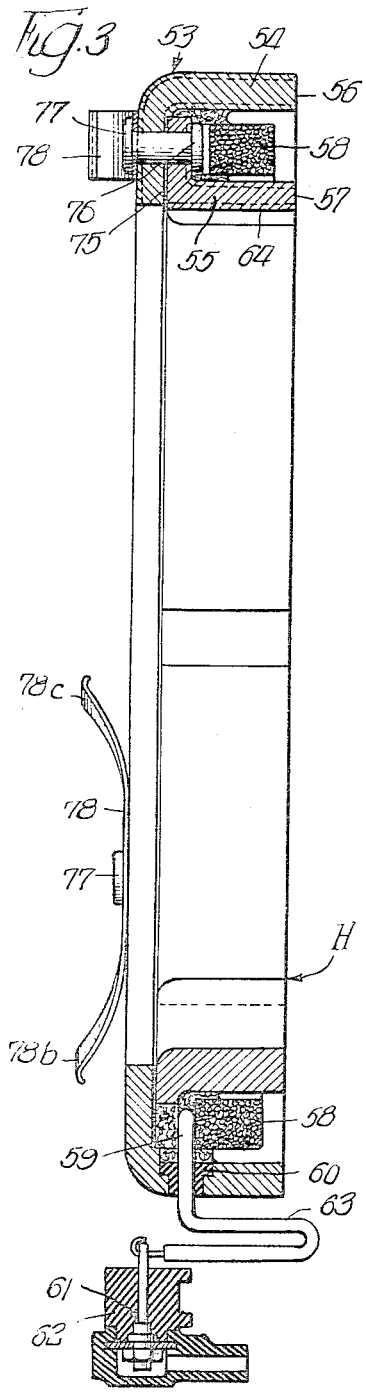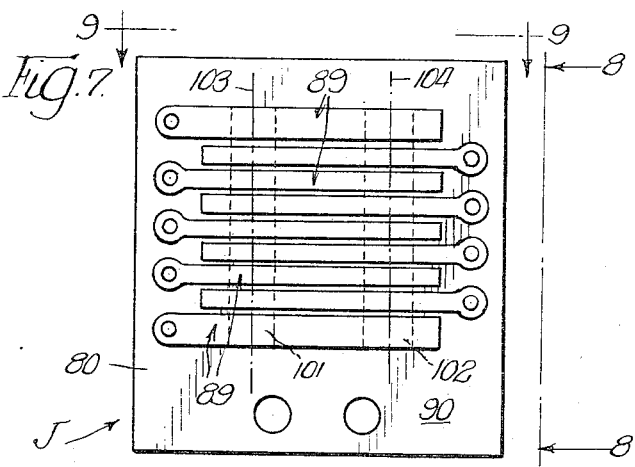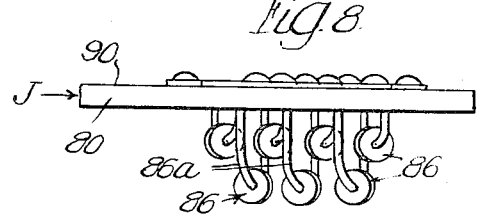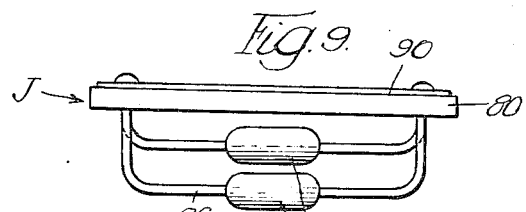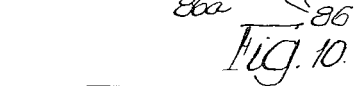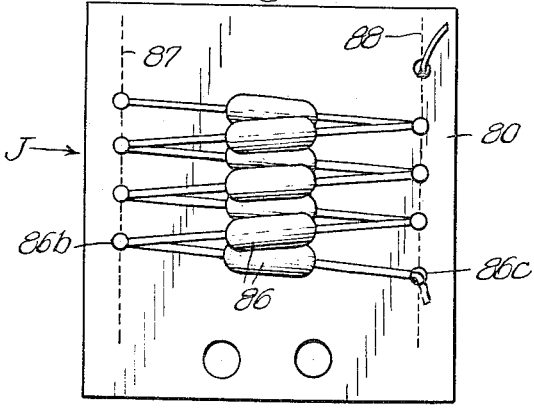
INVENTORS.
Glen R. Harting,
BY Romas B. Spokas.
Joseph W. Malleck
atty.

INVENTORS.
Glen R. Harting,
BY Romas B. Spokas,
Joseph W. Malleck
atty.

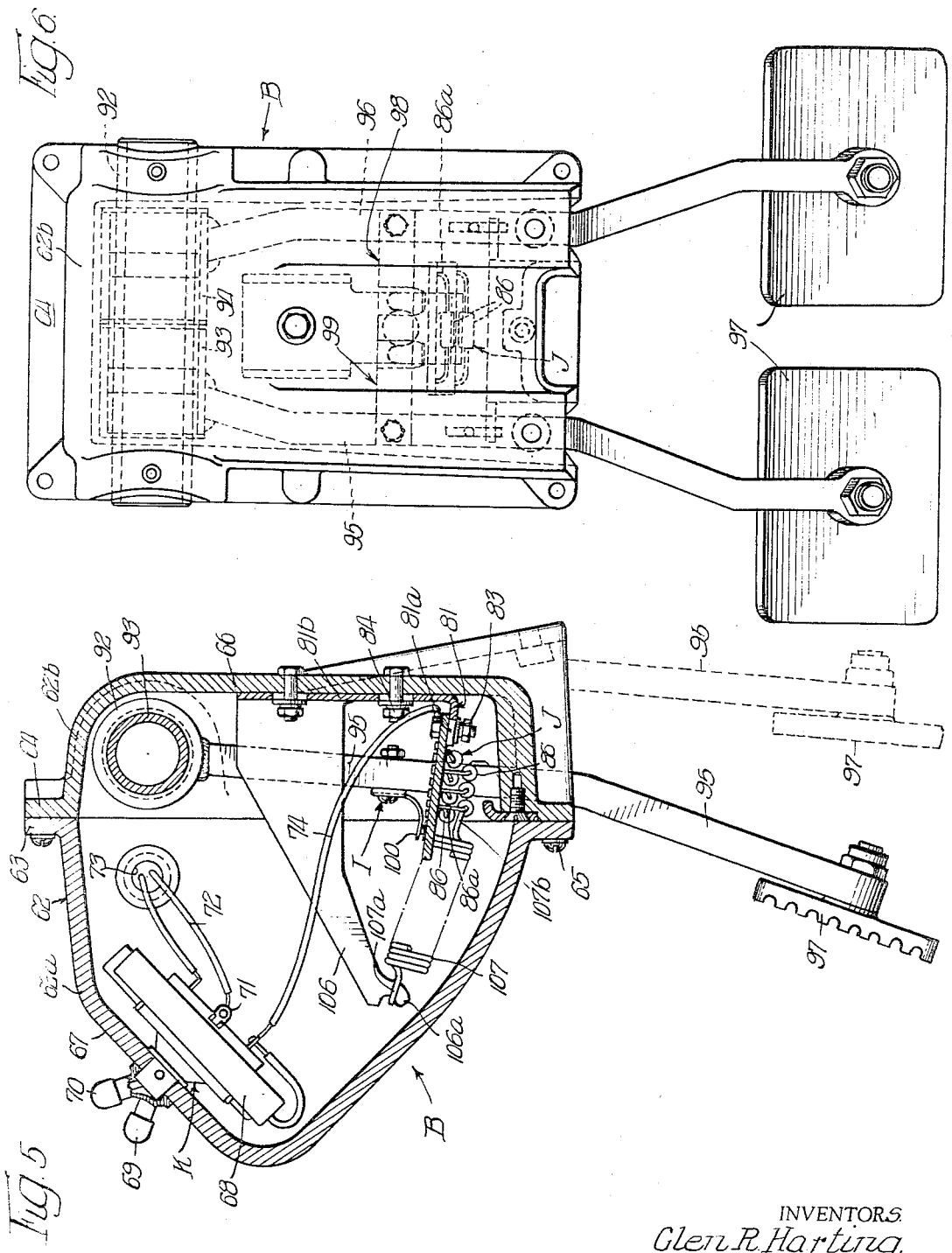

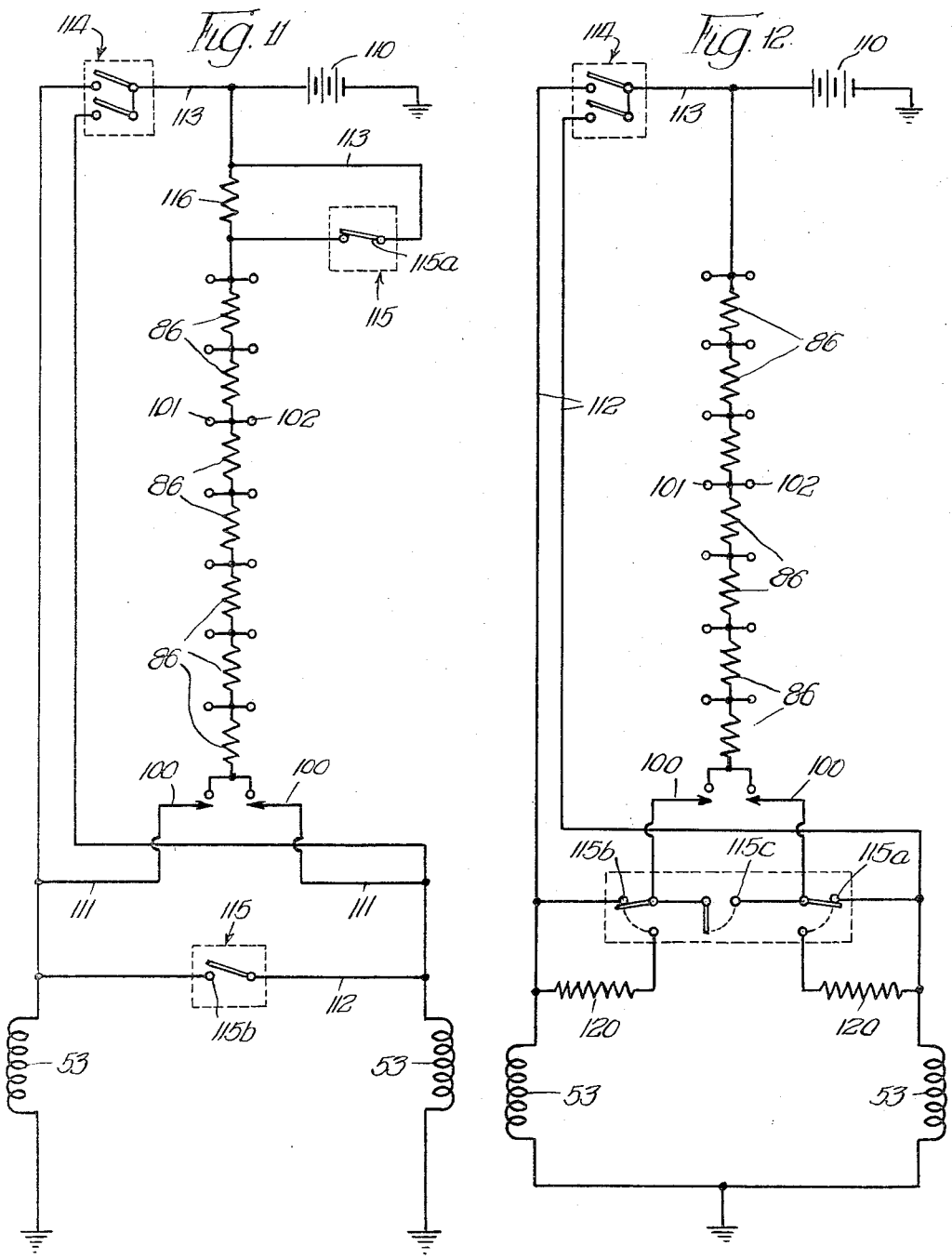

United States Patent Office 3,313,381
Patented Apr. 11, 1967

3,313,381
ELECTRO-MAGNETIC BRAKING SYSTEM
Glen R. Harting and Romas B. Spokas, Rockford, Ill., assignors to Borg-Warner Corporation, Chicago, Ill., a corporation of Illinois
Filed July 2, 1964, Ser. No. 379,898
6 Claims. (Cl. 188—161)

This invention relates to braking systems, and particularly to electro-magnetic brake systems adapted for wheeled vehicles.

Manufacturers of wheeled vehicles, such as farm tractors and other equipment related to the earth moving industry, have consistently increased the variety of available models through the years. Each model has varying space requirements and brake torque requirements which place severe limits on the accommodation of braking devices. To meet these requirements, semi-custom designed brakes have been necessary for almost all models.

It is therefore a primary object of this invention to provide an improved braking system more universally adaptable to a variety of wheeled vehicles and particularly those having large brake torque requirements.

Another object of this invention is to provide a high performance braking system utilizing electro-mechanical characteristics. Specific features pursuant to this object are: (a) provision of novel electro-magnetic actuating means which can selectively provide synchronized individual braking of a plurality of wheels; (b) an improved process for fabricating pole pieces of an electric coil member which undergoes considerable frictional stress, said process obviating typical mushrooming of said pole pieces after continuous use, characteristic of the prior art; (c) the provision of a floating friction facing or ring between the friction elements of the brake and actuating means to reduce wear; (d) the provision of an electro-magnetic coil member which is drivingly connected, such as by lugs, to an axially adjustable mechanical camming plate radially therein; (e) the provision of unique mechanical camming means in combination with an electro-magnetic actuator for incorporating self-energizing characteristics of the camming means and providing a combination of increased braking torque and accompanying reduced power consumption, (f) provision of a non-magnetic shim disposed between elements forming the electro-magnetic coil member and which is adapted to carry one or more strap springs effective to maintain the coil member and armature of said electro-magnetic means in slight continuous contact.

Another object of this invention is to provide an electro-mechanical brake of the above type, which has improved fail-proof structure and means for locking the brakes in a hill-hold condition.

Still another object of this invention is to provide a more compact and flexible brake system package which can be more easily mounted within restricted space requirements requiring no mechanical linkage between a compact control unit employing a pair of brake pedals and a brake power unit of compact annular configuration.

Yet another object of this invention is to provide a brake system having greater ease of operation and an electro-magnetic actuator which can be conditioned by finger-tip selection for brake-turning of the vehicle with use of one or more brake pedals, or can be conditioned for synchronized straight-line braking of a plurality of wheels by use of one pedal, said straight-line braking applied with automatic torque reduction for better control.

Other objects and advantages of this invention will become apparent from the following detailed description taken in connection with the accompanying drawings in which:

FIGURE 1 is a perspective view of an electromechanical braking system employing the principles of this invention and having portions thereof broken away;

FIGURE 2 is an enlarged central sectional view of the brake unit of FIGURE 1;

FIGURE 3 is a greatly enlarged sectional view of the electro-magnetic coil member forming part of the braking unit of FIGURE 2;

FIGURE 5 is a central sectional view taken through the control unit of FIGURE 1 and also showing in broken outline another operative position of the brake pedal;

FIGURE 6 is a rear elevational view of the control unit of FIGURE 5;

FIGURE 7 is an enlarged plan view of the resistance bank constituting part of the control unit of FIGURE 4;

FIGURE 8 is an edge elevational view of the resistance bank of FIGURE 7, taken substantially in the direction of line 8—8;

FIGURE 9 is another end edge elevational view taken substantially in the direction of line 9—9 of FIGURE 7;

FIGURE 10 is a plan view of the bottom portion of the resistance bank of FIGURE 7;

FIGURE 11 is a schematic circuit diagram for the electro-magnetic controls for the preferred embodiment;

FIGURE 12 is an alternative schematic circuit diagram for the electro-magnetic controls of the brake system;

Figure 4:
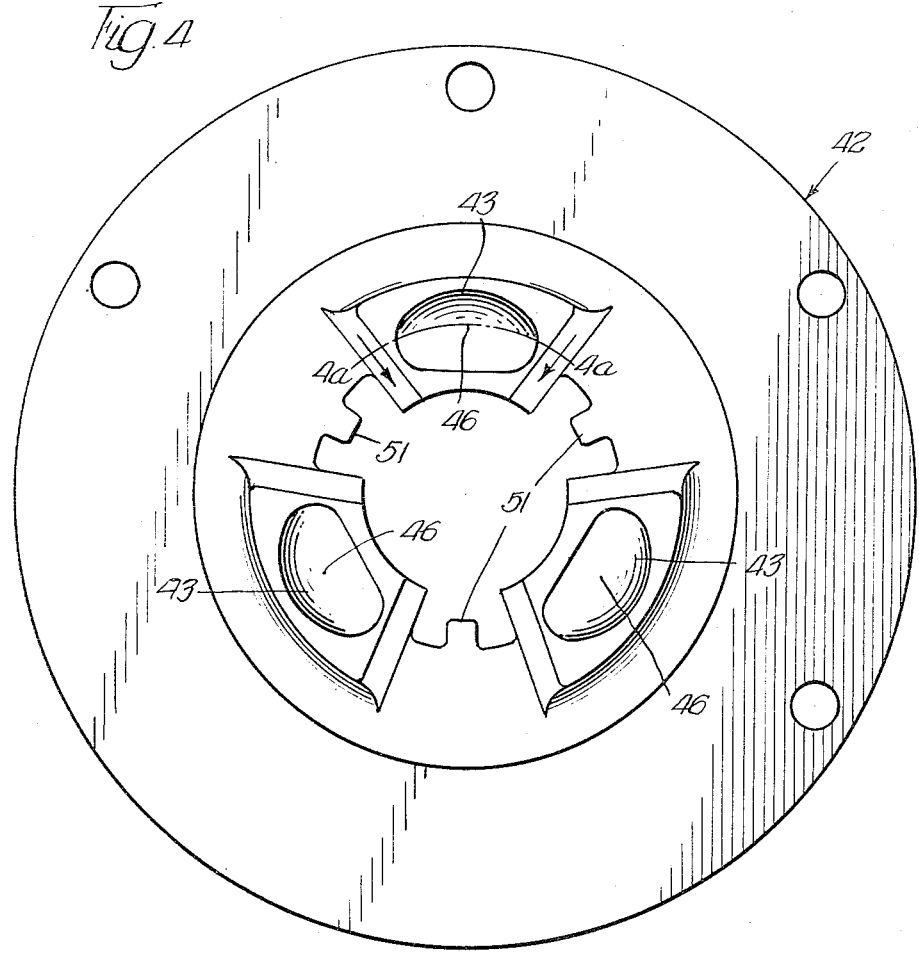
FIGURE 4 is an enlarged elevational view of the fixed cam plate forming part of the brake unit of FIGURE 2.

Turning now to the drawings and more particularly to FIGURES 1–5 there is illustrated a preferred embodiment of this invention. Such embodiment broadly comprises a system, generally designated 20, having one or more basic brake units A, a basic control unit B, the basic units being electrically interconnected and associated with a source of electrical power with which the mounting vehicle is equipped. Each of the brake units A comprises rotating means C, stationary means D (each of said means C and D having portions thereof which together constitute friction means E) and a brake force applicator means F comprising a mechanical camming means G and an electrical actuating means H.

The basic control unit B comprises broadly a manual selector means I, a resistance bank J, a plurality of control switches K (for such operations as vehicle brake-turning, straight-line braking, and hill-holding functions).

Turning now in more particularity to the components of system 20, and first to the brake unit A, FIGURES 1 and 2 show the rotating means C as constituting a shaft 21 which is connected to that portion of the vehicle, such as wheels, which is to be braked; a plurality of annular metal discs 22 are drivingly connected to the end of shaft 21 by splines 21a on the shaft received in complementary spaces 22a provided on the walls defining openings 23 in disc 22. An annular armature 24, of ferro-magnetic material, has an opening 25 with walls thereof splined to the end of shaft 21; armature 24 constitutes an end friction element cooperating with the plurality of disc 22. The armature, although grouped here with the rotating means C constitutes a portion of the electric actuating means H as will be more fully described.

The stationary means D comprises a cylindrical body 32 secured between a pair of end plates 33 and 34 by cap screws 26, the plates and body together defining a housing for the braking unit A which may be attached to a suitable portion of the vehicle by use of fasteners (not shown) extending through openings 36 in end plate 34. End plate 34 also has a central opening through which extends shaft 21. The cylindrical body 32 has a plurality of circumferentially spaced lugs 28 effective to drivingly key a plurality of friction discs 29 therewith. End plate 33 being annular in configuration and co-extensive with body 32 and end plate 33 has a central opening 37 which is closed by a flexible diaphragm cover 38 fitting within an annular recess 39 thereof.

The end plate 33 of stationary means D also constitutes a portion of the mechanical camming means G. The inwardly facing surface of end plate 33 has a plurality of circumferentially spaced cam reaction surfaces 41 (here 3 in number).

Figure 4A:
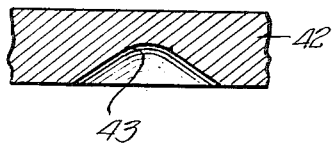
FIGURE 4a is a sectional view taken substantially along the line 4a—4a of FIGURE 4.

Camming means G also comprises a complementary ramp plate 42 which is mounted within the electrical actuating means H for limited axial movement therein, and thereby providing freedom for a camming movement with the end plate 33. Moveable ramp plate 42 is smaller in diameter than end plate 33 and has a plurality of camming surfaces 43 which are complementary to the camming surfaces 41 of end plate 33. In the disengaged condition of the brake, the centers 45 and 46 of surfaces 41 and 43 are generally axially aligned with the center 47 of the balls or rollers 44. Each of said surfaces 41 and 43 has gradually varying radial sections to form a smoothly varying ramp against which said spherical rollers may arcuately move. Each longitudinal section through said surfaces 41 or 43 will have a silhouette as shown in FIGURE 4a. The camming rollers are maintained in rolling contact with each of said surfaces 41 and 43 by retention springs 50, with each spring having opposite ends 50a and 50b connected respectively to fingers 51 extending radially inwardly from each of said ramp plates 33 and 42, said springs serve to retract the moveable ramp plate 42 upon relief of the camming action. The ramp surfaces 41 and 43 are contoured so that the tangents through the point of contact of opposite surfaces with the balls will vary but be parallel during all degrees of relative movement between the plates 33 and 42. The moveable ramp plate 42 is located and thereby mounted by the force of the retention springs urging the surfaces into a radially aligned position with the spherical rollers; clearance is maintained between the extension of shaft 21 and the inner periphery of plate 42. A floating friction facing 49 of annular disc configuration is disposed between the armature plate 24 of the moveable ramp plate 42. Such floating friction facing imparts axial thrust from the ramp plate 42 to the armature 24 for the purposes of brake engagement. Alternatively, facing 49 may be bonded to the moveable ramp plate 42 so as to be automatically retracted therewith.

The electrical actuating means H particularly comprises a coil member 53 defined by a pair of annular rings 54 and 55 formed of ferro-magnetic material such as soft iron. Each of the rings has a general L-shaped cross section and are assembled together with one leg of the L overlapping another leg of the L of an opposite ring so as to provide a general U-shaped configuration to the coil member cross section (see FIG. 3); the exposed annular terminal portions 56 and 57 of each of the rings are radially spaced apart to constitute magnetic pole pieces. A coil winding 58 is disposed annularly within the rings and is connected to a source of electrical energy through terminal 59 supported in an insulated mounting 60 on the outer ring and a terminal 61 supported in an insulated mounting 62 in the cylindrical body 32; said terminals being connected by suitable electrical leads 63; the coil member may be suitably grounded (not shown) to complete the circuit therethrough. The coil member 53 is mounted about the moveable ramp plate 42 by way of a splined connection between the inner surface 64 of the inner ring and the outer periphery 65 of the moveable ramp plate 42. Therefore, the coil member and moveable ramp plate move together through a limited angular travel in the initial phase of a braking operation as will be hereinafter described.

In order to increase the reluctance of the magnetic flux path through the coil member 53 and thereby more quickly destroy the residual magnetism upon de-energization of the coil member, an insulating shim plate 75 is disposed with the outer-peripheral margin interposed between the rings 54 and 55 of the coil member; the shim plate and magnetically permeable ring are maintained in assembled condition by fasteners such as rivets 76 extending therethrough. Strap springs 78 having an arcuate configuration are mounted with an intermediate portion 78a attached to the coil member by virtue of the rivets 77; terminal end portions 78b and 78c of the strap springs are effective to engage the plate 33. The strap springs 78 are disposed chordally with respect to a circumference of the plate 33 and are flexed during assemblage so as to maintain a constant urging of the coil member into contact with the armature 24.

A principal problem in connection with the construction of magnetic coil members having annular pole pieces serving as friction contacts has been the tendency for the metal to mushroom or deteriorate after considerable use; case-hardened metal is not desirable as a magnetic material, particularly for pole pieces, since it results in residual sticking of the armature against the coil member upon de-energization (hard steel tends to retain residual flux much in the manner of the permanent magnet). In order to avoid this problem and provide a more durable construction, the invention herein also contemplates the novel method for forming said pole pieces. Such method includes a case-hardening step before the annular ring members have been assembled together in the U-shaped arrangement illustrated in FIGURE 2; case-hardening will provide a layer of hardened metal 66 along all the exposed surfaces thereof. This is followed by a cutting operation in which the "case" or hardened metal is removed from the friction faces 56 and 57 of the coil member; the "case" is removed only along a plane passing through both pole pieces.

In operation, a braking effect is provided by energization of the coil member 53 which stimulates a magnetic force between the coil member and the armature 24 permitting the coil member to tend toward rotating with the armature member. Since the coil member is splined to the moveable ramp plate 42, plates 42 and 33 will experience relative rotation therebetween providing a camming action with the rollers which imparts thrust to the floating facing member 49 thereby applying a braking force to the clutch pack comprised of discs 22 and 29.

This invention uniquely combines generally four power features to afford a higher capacity brake with less power consumption than now known in the art, comprising: (A) the magnetic attraction between the armature and the coil member which provides a braking force on shaft 21, (B) a braking force on shaft 21 resulting from the axial camming thrust on discs 29 and 22 supplied by the action of (A) above, (C) a braking force on shaft 21 resulting from an additional camming thrust force on discs 29 and 22 supplied by the self-energization of friction disc 49 acting between the ramp plate 42 and the inner portion of armature plate 24, and (D) a braking force on shaft 21 resulting from the direct brake action of friction disc 49 on the inner portion of armature 24. The degree of braking force provided by each of these features can be varied depending upon geometrical choice of the tangent of the angles of the ramp surfaces, or by the choice of coefficient of friction of any of the friction facing 49 and of the discs 29 and 22.

An important aspect of the camming action is its ability to self-energize; this is attributable to the direction of rotation of the armature which tends to further rotate the moveable ramp plate 42 upon frictional contact therebetween urging the balls to move further up the ramp and proportionately increase the camming or wedging effect with an increase of rotation therebetween.

If manual actuation of the brake is desired, an actuating arm 60 is provided having one end 60a attached to a circumferential portion of the coil member 53 and has an opposite end 60b extending through an opening in the body 32 permitting limited arcuate movement of the arm therein. Appropriate linkage (not shown) may connect the arm 60 with manual means accessible to the operator. Movement of arm 60 causes the coil member and thereby the moveable ramp plate 42 to undergo angular movement promoting said camming action and ultimately engaging the brake.

Turning now in more particularity to the control unit B, it comprises a housing 62 defined by front and rear shell portions 62a and 62b, each having outwardly extending peripheral flanges 63 and 64, respectively, which are joined together by fasteners 65. Rear shell portion 62b may be conveniently mounted to a supporting wall of the vehicle, preferably by fasteners extending through the rear wall 66. The front shell portion 62a has an inclined surface 67 through which extends the switch means K. The switch means comprises a switch board 68 supported by the front shell portion and has a pair of spaced toggle switches 69 and 70 (the construction of toggle switches is well known in the art). Toggle switch 69 is arranged to function as a synchronizing switch while toggle switch 70 is arranged to function as a hill-holding switch, the functions being described more fully in the circuit analysis. The switch board 68 carries electrical terminals 71 associated with lead-in wires 72 extending through an entrance 73 in the front shell portion. Lead wires 74 connect the terminals of said switch means with resistance bank J.

The resistance bank J comprises a mounting board 80 of non-conductive material which is supported on the rear shell portion 62b by a bracket 81 having one flange 81a secured to the rear portion of the board by suitable fasteners 83 and an upright flange 81b secured to the rear shell portion by suitable fasteners 84. Extending downwardly from the bottom of the mounting board is a plurality of calibrated resistance elements 86 each having conductive wires 86a provided with opposed terminal portions 86b and 86c arranged in a pattern as shown in FIGURE 10. Each resistance is connected in series with the others having opposite terminal portions arranged in spaced parallel rows 87 and 88. The arrangement provides for the opposed terminals of each resistance to lay in spaced rows and with the joined terminals to be staggered in one row from opposite terminals in the other row so that a plurality of contact strips 89 may be arranged in a particular fashion above the upper surface 90 of the mounting board, each strip 89 having one end 89a electrically joined to one terminal portion 86b or 86c; adjacent strips are free to lay parallel with alternate strips extending inwardly from the same row of terminals (see FIG. 7). The contact strips 89 have a body of paper laminate which is coated with copper; each strip has a pair of contact areas 101 and 102 approximately having a width equal to one-sixth the length of the strip and formed by a localized coating of nickel-rhodium. The contact areas on the several strips are aligned in a pair of rows 103 and 104.

The manual selector means I comprises a shaft 92 journaled in the rear shell portion 62b which pivotally supports a pair of sleeves 93 and 94 each carrying a depending arm 95 and 96, respectively, with a foot pedal 97 at the bottom extremity thereof. At an intermediate portion of each arm, insulating supports 98 and 99 extend inwardly and each carries a resilient and electrically conductive tongue 100 effective to resiliently engage one row of contact areas 101 and 102 as its associated pedal is pivoted thereby swinging the tongue through an arcuate path.

A pair of arms 106 extends inwardly from the bracket 81 and each has a hooked portion 106a at the outer extremity thereof effective to mount one end 107a of a resilient retractor spring 107; the opposite end 107b of the spring is connected to one of the arms 95 and 96. The retractor spring is effective to urge a pedal arm to a neutral position as shown in full line in FIGURE 5; depression of the pedal arm to an extreme braking position, as shown in dotted outline in FIGURE 5, causes the resilient tongue to gradually traverse a series of contact areas. Any intermediate position of the pedal arm will bring into selection any number of the resistances in series of bank J; the resistances are here graduated from 1.5 ohms, 2 ohms, 3 ohms, 7.5 ohms to 20 ohms which produces a uniform brake torque increase for this application.

The electrical association of the brake coil members, switch means, resistance bank, and selector is schematically shown in a preferred manner in FIGURE 11. In this circuit, an electrical energy source 110 is connected with the series of resistance elements 86, said elements having associated contact areas 101 and 102 (representing the spaced nickel-rhodium areas on the strips 89) against which the selector tongues 100 may be stationed. Each of the tongues is electrically connected by means 111 to one brake coil member 53 (here associated with right and left tractor wheels). As the selector tongue 100 is moved from the left-hand position to the right-hand position of said resistance bank (as viewed in FIG. 11), the total degree of connected resistance is decreased by the values adjacent the resistance elements as illustrated. Said resistance values were selected on a basis to provide a constant stepped increase of brake torque as said selector tongue is moved from terminal contact area to contact area.

Figure 13:
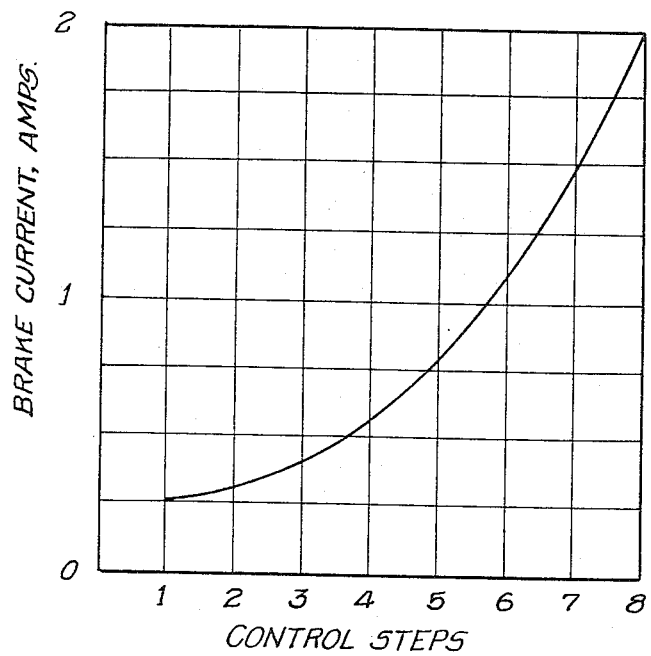
FIGURE 13 is a graphical illustration of the variation of brake current with equal increments of brake pedal movement for the brake system of FIGURE 1.
Figure 14:
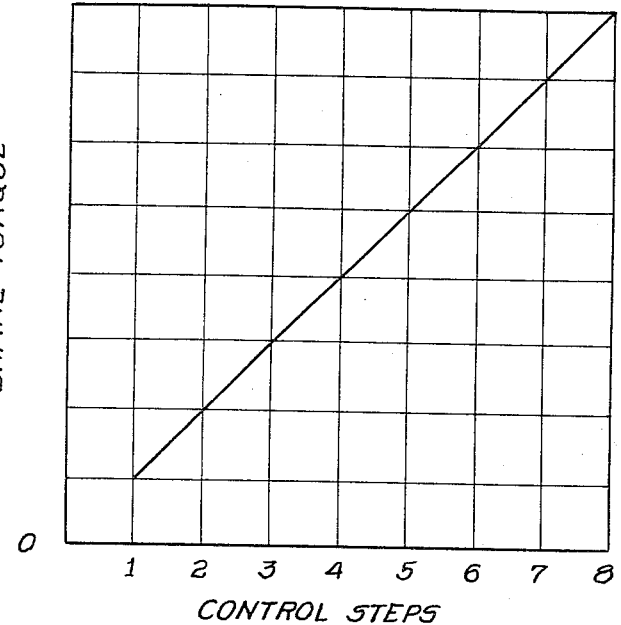
FIGURE 14 is a graphical illustration of the variation of brake torque with brake pedal movement for the brake system of FIGURE 1.

The influence of resistance element selection is shown in FIGURES 13 and 14. FIGURE 13 illustrates a plot of brake current, in amperes, against equal control steps (here being 8 in number); the current rises parabolically with an increase in control steps. In contrast, the brake torque (see FIGURE 14) rises in a constant uniform, straight-line function with an increase in control steps. To achieve the straight-line function of brake torque, the resistance elements of each brake unit must be calibrated for the specific application because such variable factors as the type of iron used for the magnetic members and the size and resistance of wire utilized in effecting the number of ampere-turns used in the coil members—all effect the choice of resistance values.

To enable the control unit to have a hill-holding function, a secondary double pole switch 114 is employed having lead-in means 13 (toggle switch 70 in FIG. 5) connected to the energy source 110 and has lead-out means 112 connected to both the said coil members 53 so as to bypass the resistance bank and thereby enable full-voltage power to apply maximum holding torque.

To enable the control unit to provide a synchronized straight-line braking of both wheels, a synchro double pole switch 115 is employed (toggle switch 69 in FIG. 5), one set of terminals 115a is arranged to bypass one non-selectable resistance element 116 when the terminals are closed; the bypassing of element 116 provides an automatic reduction in resistance that may be placed in series and thereby automatically increases braking torque during non-synchro operation. The other pair of terminals 115b is connected by leads 120 to shunt across both coil members when the terminals 115b are closed for assuring equalized current flow through both coil members in straight-line braking; the closing of terminals 115b is accompanied by opening of terminals 115a to place greater resistance in series affording automatic torque reduction for straight-line braking.

In the normal condition of the brake unit, the hill-hold switch 70 and the terminals 115b of synchro 69 are open so that actuation of the right or left pedal will provide for graduated degrees of brake application of one coil member independently of the other.

In FIGURE 12 there is schematically illustrated an alternate wiring diagram for the brake system in which the automatic torque reduction during application of the synchro switch 115 is accomplished by substituting a calibrated resistance 120 between the resistance bank and each of the coil members 53. Each of the resistance elements 120 is in lieu of the resistance element 116 of FIGURE 11. The synchro switch 115 of FIGURE 12 is comprised of a pair of terminals 115a connecting one of the brake coils with one of the tongues 100 and another set of terminals 115b connecting the other brake coil member with the tongue 100; a third set of terminals 115c is employed in combination with terminals 115a and 115b to accomplish the shunting of both brake coil members and equalize brake torque on both wheels, while placing resistance elements 120 in series.

Employment of the brake system of this invention provides each brake unit with a larger torque capacity while at the same time having a smaller power consumption. The capacity of the brake system can easily be changed to meet specific requirements in view of the simple components which can be easily varied geometrically as well as electrically.

While we have described our invention in connection with one specific embodiment and other alternative suggestions, it is to be understood that these are by way of illustration and not by way of limitation and the scope of our invention is defined solely by the appended claims which should be construed as broadly as the prior art will permit.

We claim:
1. An electro-mechanical brake, comprising: rotating means carrying one or more friction elements to be braked and carrying an annular ferro-magnetic armature moveable along the axis of said rotating means; stationary means carrying one or more friction elements inter-engageable with said friction elements of said rotating means to provide a braking effect thereof and carrying at least one cam reaction portion; and brake-force applicator comprising an energizeable coil member effective to induce a magnetic flux path through said armature causing a magnetic attraction between said coil member and armature, said applicator further comprising a camming means urged in a direction by relative rotation between said coil member and stationary means to move said friction elements into inter-engagement, and means normally urging said camming means into contact with said stationary means, said brake applicator comprises a friction disc disposed between said armature and cam follower means effective to provide for gradual conjoint rotation of said armature and camming means as said camming means is more fully urged toward said armature, said coil member being annular in configuration and effective to journal said friction disc for axial movement from a disengaged to a friction engaging condition with said armature, said annular coil member being comprised of a pair of rings, each having a general L-shape cross section, the rings being overlapped and secured together to define an armature having annular radially spaced pole pieces.

2. An electro-mechanical brake, as in claim 1, in which said armature is formed as an annular plate effective to operate as one of said friction elements carried by said rotating means for providing said braking effect.

3. An electro-mechanical brake as in claim 1, in which said rings are joined together with a non-magnetic shim plate disposed therebetween for rapidly destroying the magnetic flux field upon de-energization of said coil member, and at least one strap spring mounted upon said shim effective to urge coil member into light touching engagement with said armature at all times.

4. An electro-mechanical brake, comprising: rotating means carrying one or more friction elements to be braked and carrying an annular ferro-magnetic armature moveable along the axis of said rotating means; stationary means carrying one or more friction elements inter-engageable with said friction elements of said rotating means to provide a braking effect thereof and carrying at least one cam reaction portion; and brake-force applicator comprising an energizeable coil member effective to induce a magnetic flux path through said armature causing a magnetic attraction between said coil member and armature, said applicator further comprising a camming means urged in a direction by relative rotation between said coil member and stationary means to move said friction elements into inter-engagement, and means normally urging said camming means into contact with said stationary means, said camming means of said applicator includes an annular ramp plate provided with a plurality of rollers disposed between said stationary means and said ramp surfaces effective to ride up upon said ramp surfaces when relative rotation occurs between said ramp plate and stationary means.

5. An electro-mechanical brake, as in claim 4, in which said ramp plate is splined to the coil member for relative sliding movement therebetween.

6. An electro-mechanical brake, as in claim 4, in which said means normally urging said cam plate and stationary means together comprises a plurality of circumferentially spaced coil springs each having an opposite end connected respectively to said cam plate and stationary means.

References Cited by the Examiner

UNITED STATES PATENTS

| | | | |
|---|---|---|---|
| 1,993,494 | 3/1935 | Weiscopf | 338—260 |
| 2,526,143 | 10/1950 | Lambert | 188—72 |
| 2,801,719 | 8/1957 | Clerk | 192—35 |
| 2,914,141 | 11/1959 | Klaue | 188—72 |
| 2,964,137 | 12/1960 | Luedtke et al. | 188—71 |
| 3,029,496 | 4/1962 | Levi | 29—155.59 |
| 3,054,476 | 9/1962 | Corrigan | 188—16 X |
| 3,131,462 | 5/1964 | Owings et al. | 29—155.59 |

DUANE A. REGER, *Primary Examiner.*